United States Patent [19]
Osterman

[11] Patent Number: 5,867,650
[45] Date of Patent: Feb. 2, 1999

[54] OUT-OF-BAND DATA TRANSMISSION

[75] Inventor: Lawrence William Osterman, Woodinville, Wash.

[73] Assignee: Microsoft Corporation, Redmond, Wash.

[21] Appl. No.: 679,632

[22] Filed: Jul. 10, 1996

[51] Int. Cl.[6] .................................................. G06F 15/16
[52] U.S. Cl. ............................... 395/200.33; 395/200.31; 395/200.6
[58] Field of Search ........................... 395/200.6, 200.68, 395/200.69, 200.33, 200.31

[56] References Cited

U.S. PATENT DOCUMENTS

| | | | |
|---|---|---|---|
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,307,490 | 4/1994 | Davidson et al. | 395/650 |
| 5,442,749 | 8/1995 | Northcutt et al. | 395/200.09 |
| 5,465,351 | 11/1995 | Lemmo | 395/600 |
| 5,491,800 | 2/1996 | Goldsmith et al. | 395/200.12 |
| 5,537,417 | 7/1996 | Sharma et al. | 370/94.1 |
| 5,642,515 | 6/1997 | Jones et al. | 395/727 |

OTHER PUBLICATIONS

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Douglas E. Comer, "Internetworking with TCP/IP, vol. I," Prentice Hall, 1991, Chapter 21, pp. 335–363.

Larry Garlick, "Out–of–Band Control Signals in a Host–to–Host Protocol," Network Working Group, RFC 721, Sep. 1976, pp. 1–6.

"XDR: External Data Representation Standard ," Sun Microsystems, Jun. 1987, pp. 1–20.

"RPC: Remote Procedure Call Protocol Specification Version 2," Sun Microsystems, Jun. 1988, pp. 1–25.

"Status–Codes (rpc7) and uuid_s_soclat_failure," http://wwwacn.cornell–iowa.edu/htbin/helpgate/HELP/DCE RPC/STATUS–CODES.

"HTML Man Page For rpc_server_use_all_protsegs_if," http://www. ux1.eiu.edu/~csjay/dce/rpc_server_use_all_protsegs_if.htm.

"Creating a development and network environment for client/server computing," http://www.NobleNet.com/TechNote/tn_setup.htm.

"Tcp/Ip Tutorial and Technical Overview," http://www.tp3.ruhr–uni–bochum.de/rs6000_redbooks/htmlbooks/gg243376.04/3376c410.html#rpc.

John Shirley et al., Microsoft RPC Programming Guide, Mar. 1995, O'Reilly & Associates, Inc., Sebastopol, California.

*Primary Examiner*—Mehmet B. Geckil
*Attorney, Agent, or Firm*—Workman, Nydegger, Seeley

[57] ABSTRACT

A computer-implemented method uses out-of-band data transmission to reduce overhead associated with data transmission between a client process and a server process in a computer system employing a request-response protocol. Initially, a data transmission connection is established between the client process and the server process using the request-response protocol. Thereafter, data is transmitted between the client process and the server process using the connection, and without using the request-response protocol to transmit the data.

14 Claims, 5 Drawing Sheets

OUT-OF-BAND DATA TRANSMISSION

BACKGROUND OF THE INVENTION

The invention is directed to computing systems in which a client process communicates with a server process.

A computing system may include a client computer that communicates with a server computer over a network. In such a system, referred to as a distributed computing system, a client process (i.e., a process running on the client computer) causes a server process (i.e., a process running on the server computer) to perform an operation by sending a request to the server process over the network. The server process responds by performing the operation and returning any resulting data to the client process over the network.

Exchanges of requests and responses between the client and server processes may be made using the Remote Procedure Call ("RPC") protocol. The RPC protocol is discussed, for example, in "Microsoft RPC Programming Guide", John Shirley and Ward Rosenberry, O'Reilly & Associates, Inc., Sebastopol, Calif., 1995, which is incorporated herein by reference.

The RPC protocol permits the client process to communicate with the server process by making a procedure call to the server process. RPC software running on the client computer automatically transmits the procedure call to the server computer. RPC software running on the server computer receives the procedure call and initiates a response by the server process. The RPC software then returns the results to the client computer.

SUMMARY OF THE INVENTION

A computer-implemented technique permits efficient transmission of large amounts of data between a client process and a server process that normally communicate using a request-response protocol such as the RPC protocol. Initially, the request-response protocol is used to establish a data transmission connection between the client process and the server process. Thereafter, data is transmitted between the client process and the server process using the connection, and without using the request-response protocol to transmit the data.

The RPC protocol provides for transmission of small amounts of data in a reasonably efficient manner. However, the overhead associated with the request-response nature of the RPC protocol substantially impedes performance when large amounts of data (e.g., a gigabyte or more) are transferred between the client process and the server process. In particular, the RPC protocol may limit data transmissions to 16 kilobytes per request-response pair. When large amounts of data are to be transmitted, this limitation quickly degrades the performance efficiency of the transfer process because the server process must wait for an additional RPC request after each 16 kilobyte transfer.

The technique permits efficient transmission of large amounts of data without sacrificing the security features and other benefits provided by the RPC protocol or similar request-response protocols. The technique may be used to transmit data from a server process to a client process, or from a client process to a server process. As discussed below, use of the technique in a server-to-client transfer provides a simplified error reporting mechanism.

When the technique is used to transmit data from the server process to the client process, the client process first allocates a reception object at which the data will be received. Examples of a reception object include, but are not limited to, a port configured to receive data according to a low level protocol such as TCP/IP (transfer control protocol/internet protocol) or a region of shared memory in a system in which the client process and the server process are running on the same computer.

After allocating the reception object, the client process sends an RPC request to the server process. The RPC request identifies the reception object and indicates that the reception object will be used for out-of-band transmission of large amounts of data. The server process connects to the reception object and responds to the RPC request by indicating that the connection has been made. The client process then sends an RPC request to instruct the server process to transmit the desired data to the reception object. The server process transmits the data to the reception object using a low level protocol associated with the reception object. When all of the data has been transmitted, the server process responds to the RPC request by indicating that the transmission is complete.

If an error occurs during transmission of the data, the server process returns an error message in response to the RPC request. The client process then responds to the error in an appropriate manner. This mechanism lets the server process provide error information to the client without imposing an external structure on the data stream transmitted from the server process to the client process. This, in turn, avoids the overhead and transmission delays associated with such an external structure.

The technique provides the security associated with request-response protocols without requiring most of the overhead associated therewith. The technique does this by using a secure request-response protocol such as the RPC protocol to establish a link for unsecured data transmission. Since the client process creates the reception object and communicates the identity of the reception object to the server using a secured and, in some instances, encrypted channel, the server process is able to verify that the client process requesting the data is a valid client process. Since the server process transmits the data in response to a request by the client process and to a reception object identified by the client process, the client process is assured that the transmitted data is from a known server process. If necessary, the server process could encrypt the transmitted data stream to provide additional security.

Implementations of the technique may include one or more of the following features. A data transmission connection may be established by having the client process allocate a reception object, having the client process identify the reception object to the server process, and having the server process connect to the reception object.

The out-of-band data transmission may include having the client process send a read request to the server process. Thereafter, the server process writes data to the reception object in response to the read request and the client process reads data from the reception object. Once the requested data has been written to the reception object, the server process responds to the read request. The read request and the response thereto may be made using a request-response protocol such as the RPC protocol.

The server process may be located on a server computer and the client process may be located on a client computer. The server computer may be connected to the client computer by a network, and the reception object may be a TCP/IP socket. The reception object may also be a shared memory region, and the client process and the server process may be located on a common computer.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
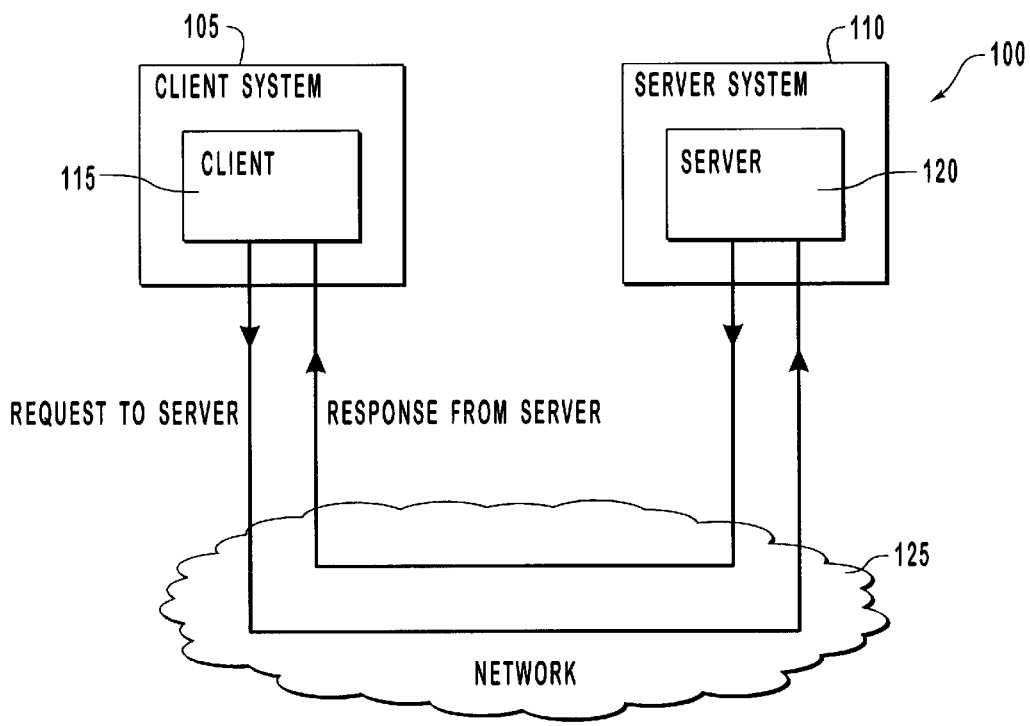
FIGS. 1 and 2 are block diagrams of a distributed client-server computer system.

FIG. 1 illustrates a distributed computing system 100 that includes a client system 105 and a server system 110. A client process 115 runs on the client system and a server process 120 runs on the server system. The client process 115 communicates with the server process 120 over a network 125.

Figure 2:
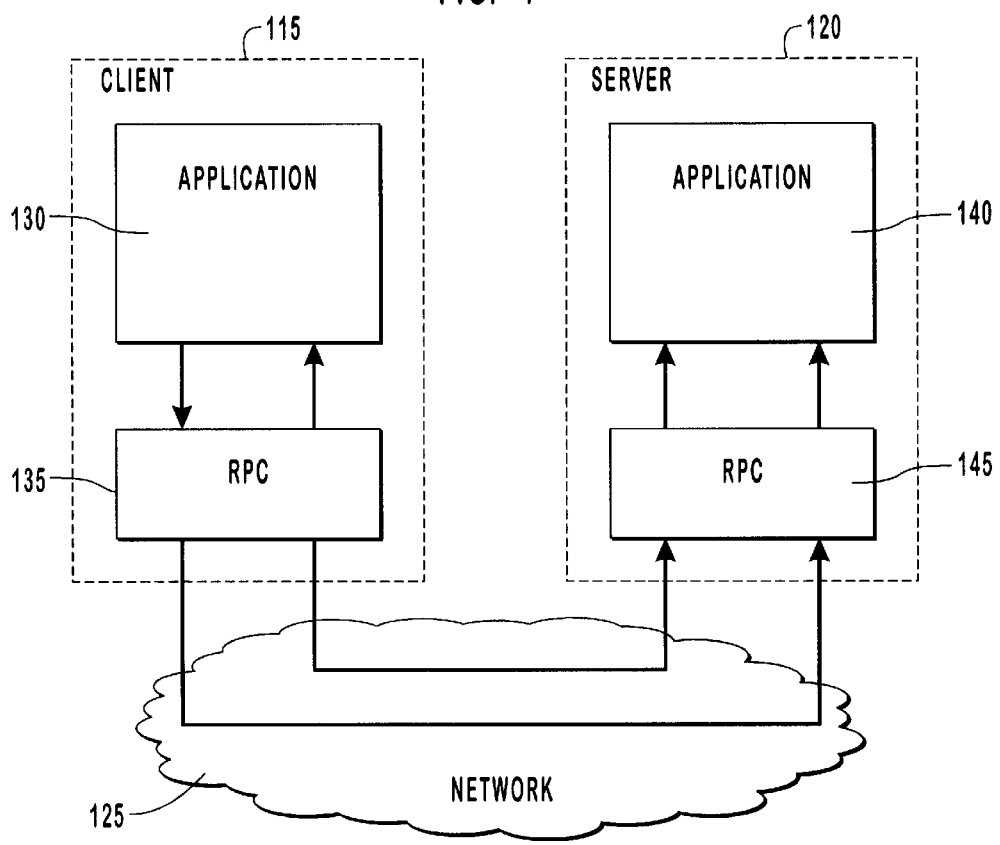

As shown in FIG. 2, the client process 115 includes application code 130 that provides functionality to a user. The application code 130 communicates with the server process 120 by making remote procedure calls ("RPCs") to the server process.

Client RPC software 135 is positioned beneath the application code 130. The client RPC software 135 receives RPCs from the application code 130 and sends them to the server process 120 over the network 125. Client RPC software 135 may be implemented using a standard RPC runtime library. The runtime library includes procedures that convert a request from the RPC handler software to an appropriate format for transmission to the server system 110 and transmit the converted request over the network 125. The runtime library also includes procedures that provide data integrity, data security and a transmission protocol appropriate for the network 125.

The server process 120 similarly includes application code 140 and server RPC software 145. The server RPC software 145, which also may be implemented using a standard RPC runtime library, includes procedures that format requests received from the client RPC software 135 and pass the requests to the application code 140. The RPC software 145 may be identical to the RPC software 135.

The application code 140 performs the procedure requested in the call and returns the results, if any, to the server RPC software 145. The server RPC software 145 transmits the results to the client process 115 over the network 125.

In some circumstances, the client application code 130 may need to receive large amounts of data from the server application code 140. For example, the client application code 130 may need to backup a large file located at the server system 110. As discussed above, the RPC protocol does not provide an efficient mechanism for transmitting large amounts of data.

Figure 3:
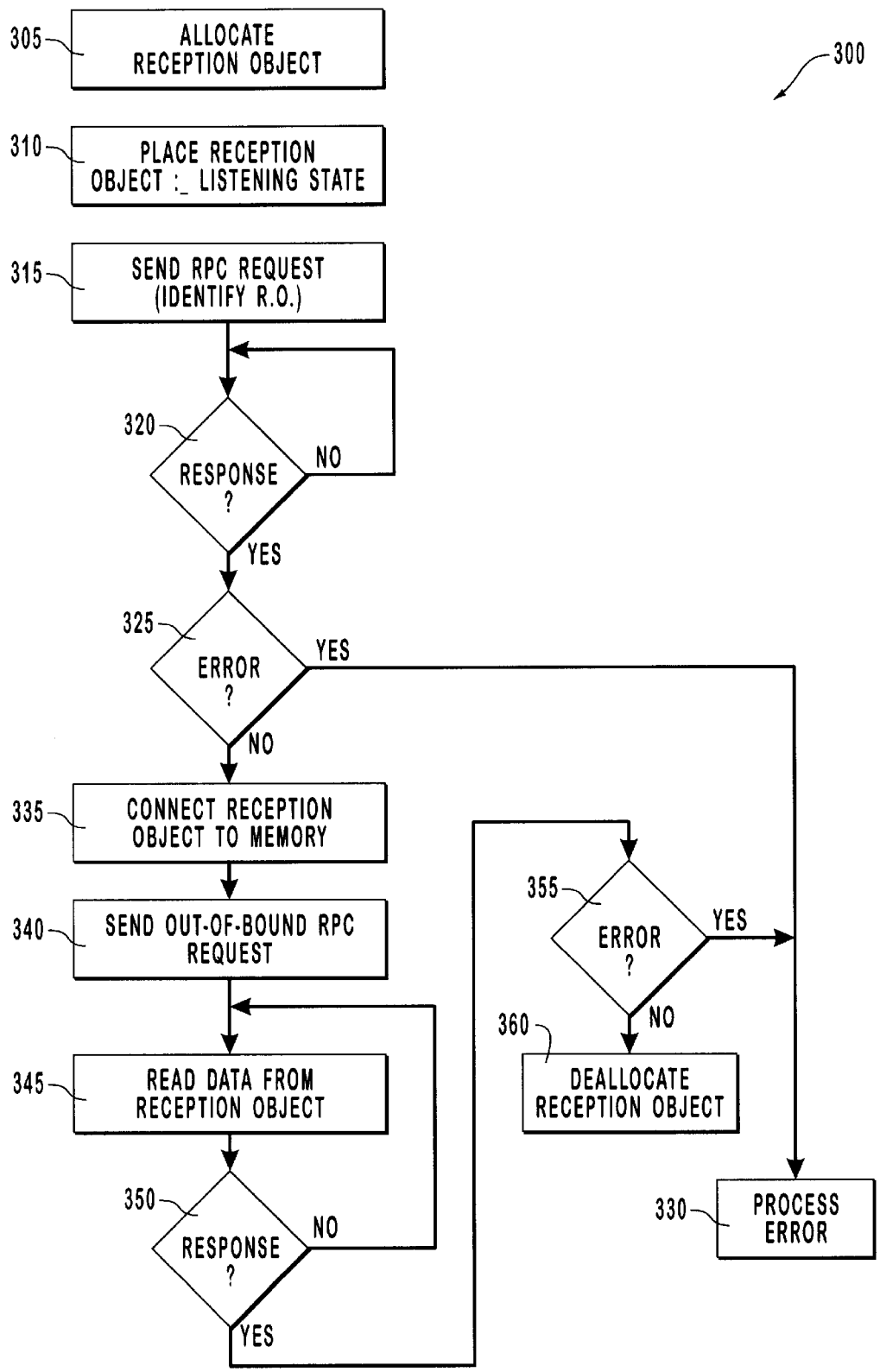
FIGS. 3 and 4 are flow charts of procedures for performing out-of-band data transmission.
Figure 4:
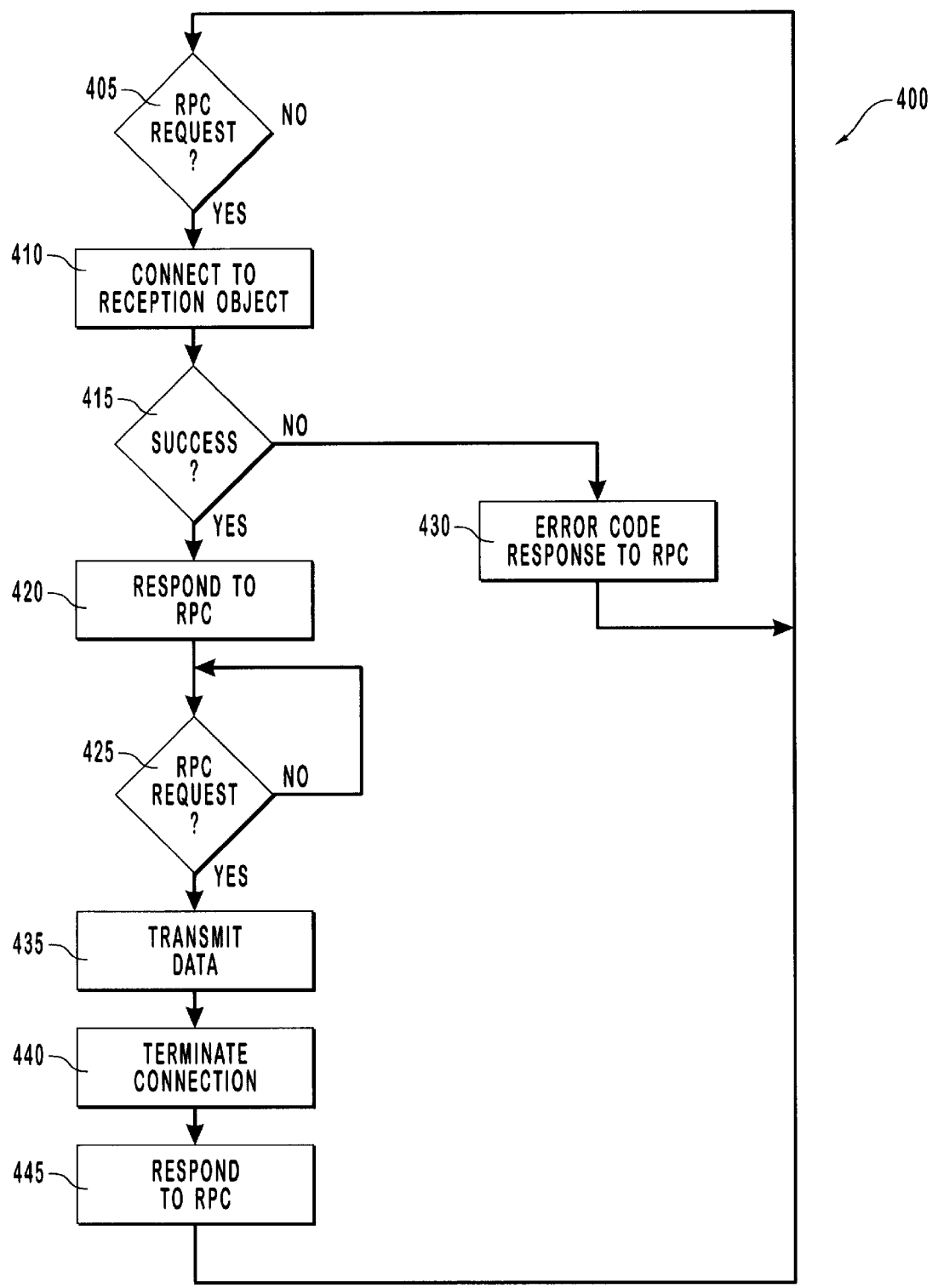

To remedy this problem, the client application code 130 requests data from the server application code 140 using the procedure 300 illustrated in FIG. 3, and the server application code 140 provides the data using the procedure 400 illustrated in FIG. 4.

Figure 5A:
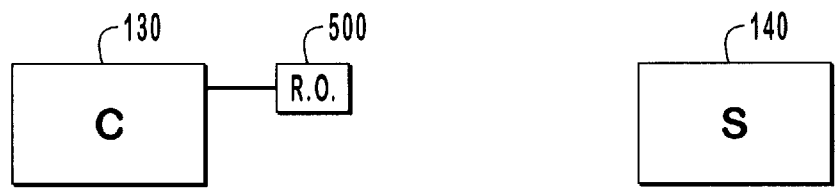
FIGS. 5A–5H are block diagrams illustrating the status of client and server processes during steps of the procedures of FIGS. 3 and 4.

Referring also to FIG. 5A, the client application code 130 initially allocates a reception object 500 (step 305). For example, if the client system 105 communicates with the server system 110 using the TCP/IP network transport, then the client application code 130 allocates a TCP/IP socket as the reception object 500. After allocating the reception object, the client application code 130 places the reception object in a listening state in which the reception object is ready to accept connections (step 310).

Figure 5B:
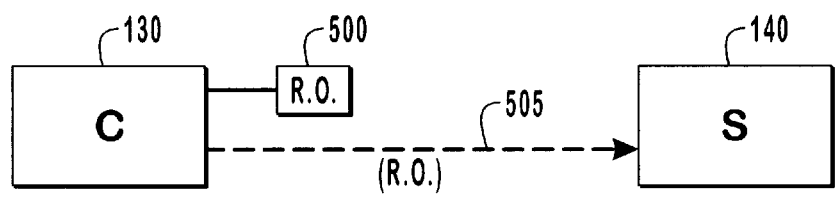

Referring also to FIG. 5B, the client application code 130 then sends an RPC request 505 to the server application code 140 (step 315). The RPC request 505 identifies the reception object 500 and the client process 115. For example, the RPC request 505 may identify a reception object 500 that is a TCP/IP socket by providing the address of the TCP/IP socket. After sending the RPC request, the client application code 130 waits for a response (step 320).

Initially, the server application code 140 waits for the RPC request 505 identifying a reception object (step 405). It is important to note that this and other waiting states are provided only for ease of discussion. Neither the server application code nor the client application code necessarily remains idle while in a waiting state. Rather, the application codes may, and typically will, perform other operations while waiting.

Figure 5C:
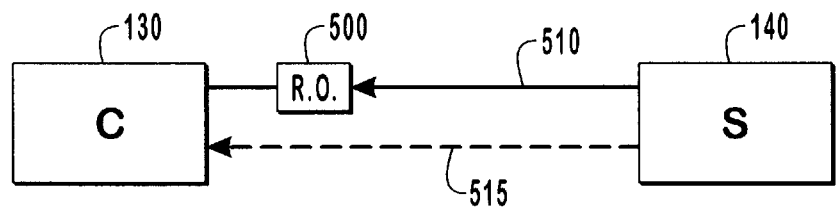

Upon receiving the RPC request 505, the server application code 140 attempts to connect to the reception object 500 (step 410). For example, if the reception object 500 is a TCP/IP socket, the server application code 140 may attempt to connect to the reception object using the address supplied in the RPC request. As shown in FIG. 5C, if the server application code 140 successfully makes a connection 510 to the reception object (step 415), the server application code 140 indicates the success in a response 515 to the RPC request (step 420) and waits for a RPC request to read data (step 425). If the server application code 140 is unsuccessful in making a connection, then the server application code enters an idle state and waits for a RPC request 505 identifying a reception object (step 405). Prior to entering the idle state, the server application indicates that an error has occurred and that connection to the reception object was unsuccessful by providing a response 515 to the RPC request (step 430).

Since the client uses the secure RPC mechanism to provide the server with the identity of the reception object 500 and the identity of the client, the server is able to verify the identity of the client and that the client is permitted access to the data to be transmitted. Similarly, since the server uses the secure RPC mechanism to verify that the connection has been made, the client is able to verify that the server is actually the source of transmitted data.

Upon receiving the response 515 to the RPC request, the client application code 130 examines the response to determine whether an error has occurred (step 325). If an error has occurred, the client application code 130 processes the error (step 330).

Figure 5D:
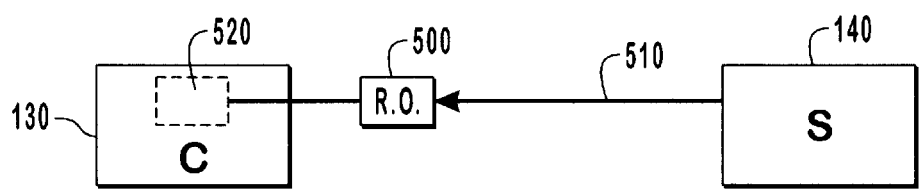
Figure 5E:
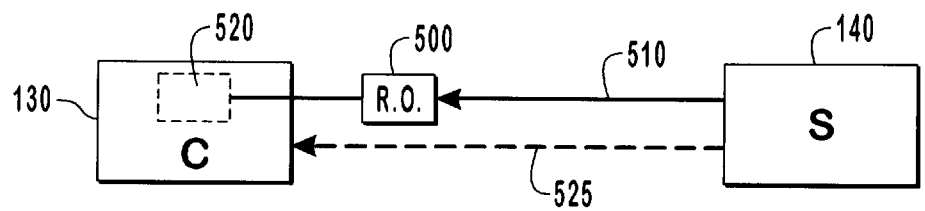

Referring to FIG. 5D, if no error has occurred, the client application code 130 connects the reception object 500 to a region of memory 520 (step 335). The client application code 130 will place in the region of memory 520 data transmitted to the reception object by the server application code 140. Then, as shown in FIG. 5E, the client application code 130 issues an RPC request 525 for out-of-band data transmission from the server application code 140 (step 340).

After issuing the RPC request 525, the client application code 130 reads data from the reception object 500 (step 345) and places the data in the region of memory 520. Client application code 130 continues to read data until the client application code receives a response to the RPC request 525 from the server application code 140 (step 350).

Figure 5F:
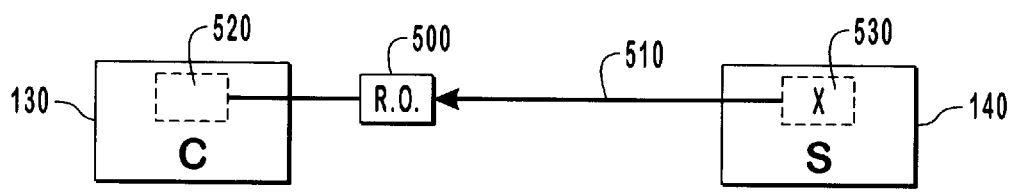

Upon receiving the RPC request 525, the server application code 140 transmits the requested data using the connection 510 (step 435). In particular, as shown in FIG. 5F, the server application code 140 transmits the requested data from a region of memory 530 in which the data is located to the reception object 500. As noted above, the client application code 130 then transmits the data to the memory 520. This is an asynchronous transmission that does not require client involvement or client responses except to the extent that such involvement or responses are required by the underlying network transport (e.g., TCP/IP).

Figure 5G:
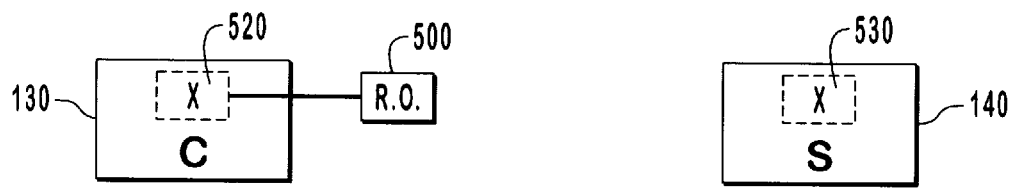

Referring to FIG. 5G, once all of the requested data has been transmitted (or an error has occurred), the server application code 140 gracefully terminates the connection 510 (step 440) and transmits to the client a response 535 to the RPC request 525 (step 445). If an error has occurred, the server application code 140 identifies the error in the response 535. Otherwise, the server application code 140 indicates in the response 535 that all of the data has been transmitted. Thereafter, the server application code 140 waits for a RPC request 505 identifying a reception object (step 405).

Figure 5H:

Upon receiving the response 535, the client application code 130 examines the response to determine whether an error has occurred (step 355). If an error has occurred, the client application code 130 processes the error (step 330). Referring to FIG. 5H, if no error has occurred the client application code 130 deallocates the reception object (step 360) to complete the procedure 300.

A backup technique using procedures 300 and 400 has been implemented in the Microsoft Exchange Server product. This technique uses two applications programming interfaces (APIs), referred to as BackupOpen( ) and BackupRead( ). When the client application code 130 and the server application code 140 are running on different computers, the APIs have been implemented using TCP/IP as the network transport for out-of-band transmissions. The APIs have also been used for local backup (where the client application code 130 and the server application code 140 are running on the same computer). In the local backup implementation, the APIs perform the out-of-band communication using a shared memory region.

The BackupOpen( ) API creates a connection that the client uses for subsequent calls to BackupRead( ). The client is expected to call BackupOpen( ) once for each file being backed up and to call BackupRead( ) for each chunk of data being read from the file. In the absence of errors, the BackupRead( ) API is guaranteed to return some data, but not necessarily the entire amount of data requested by the client. For example, the BackupRead( ) API might return 20 bytes of data in response to a request from the client for four kilobytes of data. (In general, this condition is imposed by the TCP/IP transport, which does not necessarily deliver to a client within a specified time frame the full amount of data that was transmitted from a server.)

In the TCP/IP implementation, the BackupOpen( ) API creates a TCP/IP socket (i.e., a reception object) at the client and places the socket in the listening state by calling the standard listens API. The TCP/IP implementation of BackupOpen( ) also determines the address of the socket (using the standard getsockaddr( ) API) and the host IP addresses for the client computer (using the standard gethostbyname( ) API). The TCP/IP implementation of BackupOpen( ) then uses an RPC request to pass to the server the identity of the socket along with a list of host IP addresses available on the client computer.

The list of host IP addresses is provided when the client computer includes multiple net cards. This ensures that the server computer will be able to connect to the client computer. When the client computer includes multiple net cards, the client computer will have multiple host IP addresses (one for each net card). Since the client computer may only be accessible from the server computer via one of the net cards, all host IP addresses of the client computer need to be presented to the server computer. Of course, if the client computer has only a single host IP address, then only that single address would be provided to the server computer.

The server receives the list of host IP addresses. The server then attempts to connect to the addresses in turn. If the server successfully connects to the client, then the server indicates in the response to the BackupOpen( ) RPC request that out-of-band data transmission will use TCP/IP. The client remembers this for subsequent calls to the BackupRead( ) API.

The first call to the BackupRead( ) API creates a thread on the client that issues a backup read RPC request to the server. A thread is a subprocess that runs independently using resources (e.g., memory and address space) allocated to a process. The RPC request remains outstanding until the entire data stream has been transmitted from the server to the client.

At the server, the backup read RPC request creates a process on the server that can be used to transmit the data to the client. If an error occurs during data transmission, the server simply returns an error code identifying the error. The client process then returns from the read data RPC request with the error code from the server.

If the backup read RPC request were not used, the server would need to create a process during the BackupOpen( ) API. The server then would have to deal with removing the process if an error occurred. In addition, there would be no convenient way of providing error information to the client from the server without imposing an external structure on the data stream transmitted between the client and the server.

All calls to the BackupRead( ) API, including the first call, cause the client to issue an asynchronous read request on the socket created by the BackupOpen( ) API and wait until either the asynchronous read request completes or a response is received for the read data RPC request (which indicates that an error has occurred or that all data has been transmitted). If the asynchronous read request completes, the BackupRead( ) API returns data to the caller. If a response is received for the read data RPC request, the BackupRead( ) API returns the error to the caller or indicates to the caller that all data has been transferred.

If, during execution of the BackupOpen( ) API, the server were unable to connect to the client, then the server would indicate this in the response to the BackupOpen( ) RPC request. Thereafter, the BackupRead( ) API would issue the backup read RPC request discussed above. However, since both the client and the server would know that they are not using the out-of-band transmission mechanism, the server would simply read the data requested and return it to the client using normal RPC data transmission mechanisms. Thus, the data transmission technique falls back to normal RPC transmissions in the worst case. This means that the client will always be able to read data from the server, even if the client and the server do not meet the criteria for out-of-band transmission.

In the shared memory implementation, the BackupOpen( ) API creates a shared memory region and then communicates the name of the shared memory region to the server in an RPC request. The server then attempts to open the shared memory region. If the server successfully opens the shared memory region, then the server indicates in the response to the BackupOpen( ) RPC request that the out-of-band data transmission will use the shared memory region. Otherwise, the server indicates to the client that the attempt to open the shared memory region was unsuccessful. The BackupRead( ) API for the shared memory implementation works in the same way as the BackupRead( ) API for the TCP/IP implementation.

With both implementations, data transmission occurs at maximum speeds. Server data transmission is asynchronous relative to the client, and the server transmits data to the client as fast as the client can accept the data. In the shared memory implementation, the minimal synchronization between the client and server means that there is minimal communication overhead between the client and server to slow down the data transmission.

Other embodiments are within the following claims.

What is claimed is:

1. In a distributed computing system which includes a plurality of client systems each running one or more client processes, and a plurality of server systems each running one or more server processes, and wherein each client system is connected either directly or logically to one or more said server systems, and wherein a client process communicates with at least one server process using remote procedure call (RPC) protocol, a method of permitting transmission of large amounts of data between the client process and the server process without using the RPC protocol to transmit the data, but while retaining the accuracy and security provided by the RPC protocol, the method comprising the steps of:

initiating a client process at a client system and allocating a reception object at the client system which is designated for receiving data that is required to be transmitted by one of the server processes to the initiated client process, said allocation occurring before the client process sends a request for said data to said one server process;

sending a secure RPC request from the initiated client process to said one server process for the data, said RPC request identifying and verifying the reception object so as to establish an out-of-band communication procedure for the data which will thereafter permit transmission from the server system to the identified reception object of the client system using a low level protocol instead of the RPC protocol, but thereby still maintaining security of the identified reception object and corresponding out-of-band transmission;

said one server process responding by using the RPC protocol to the secure RPC request from the initiated client process by connecting to the identified reception object and confirming to the initiated client process that the connection has been made; and said server process thereafter transmitting the data to the identified reception object of the client system using the established out-of-band communication procedure.

2. The method of claim 1 further comprising the step of returning an error message from the server process to the client process if an error occurs during transmission of the data in response to the RPC request, so that transmission delays are avoided during said step of transmitting the data in the event of such an error.

3. The method of claim 1, wherein the step of transmitting data comprises:

having the client process send a read request to the server process;

having the server process write data to the reception object in response to the read request;

having the client process read data from the reception object; and having the server process respond to the read request once the requested data has been written to the reception object.

4. The method of claim 3, wherein the read request and the response thereto are made using the request-response protocol.

5. The method of claim 1, wherein the reception object comprises a TCP/IP socket.

6. The method of claim 1, wherein the reception object comprises a shared memory region.

7. The method of claim 1, wherein the client process and the server process are located on a common computer.

8. The computer software of claim 7, wherein the instructions for causing the computer system to transmit data comprise:

instructions for having the client process send a read request to the server process;

instructions for having the server process write data to the reception object in response to the read request;

instructions for having the client process read data from the reception object; and instructions for having the server process respond to the read request once the requested data has been written to the reception object.

9. The computer software of claim 8, wherein the read request and the response thereto are made using the request-response protocol.

10. In a distributed computing system which includes a plurality of client systems each running one or more client processes, and a plurality of server systems each running one or more server processes, and wherein each client system is connected either directly or logically to one or more said server systems, and wherein a client process communicates with at least one server process using remote procedure call (RPC) protocol, a computer program product for implementing, within the distributed system, a method of permitting transmission of large amounts of data between the client process and the server process without using the RPC protocol to transmit the data, but while retaining the accuracy and security provided by the RPC protocol, the computer program product comprising:

a computer readable medium for carrying program code means; and wherein the program code means comprises computer readable instructions for implementing a method comprising the steps of:

Initiating a client process at a client system and allocating a reception object at the client system which is designated for receiving data that is required to be transmitted by one of the server processes to the initiated client process, said allocation occurring before the client process sends a request for said data to said one server process;

sending a secure RPC request from the initiated client process to said one server process for the data, said RPC request identifying and verifying the reception object so as to establish an out-of-band communication procedure for the data which will thereafter permit transmission from the server system to the identified reception object of the client system using a low level protocol instead of the RPC protocol, but thereby still maintaining security of the identified reception object and corresponding out-of-band transmission;

said one server process responding by using the RPC protocol to the secure RPC request from the initiated client process by connecting to the identified reception object and confirming to the initiated client process that the connection has been made; and said server process thereafter transmitting the data to the identified reception object of the client system using the established out-of-band communication procedure.

11. The computer program product of claim 10 wherein said method further comprises the step of returning an error message from the server process to the client process if an error occurs during transmission of the data in response to the RPC request, so that transmission delays are avoided during said step of transmitting the data in the event of such an error.

12. The method of claim 10, wherein the reception object comprises a TCP/IP socket.

13. The computer software of claim 10, wherein the reception object comprises a shared memory region.

14. The computer software of claim 10, wherein the client process and the server process are located on a common computer.

* * * * *